United States Patent [19]

Akita et al.

[11] 4,035,789
[45] July 12, 1977

[54] LIQUID LEVEL SENSING SYSTEM

[75] Inventors: Sigeyuki Akita; Junji Kitagawa, both of Okazaki, Japan

[73] Assignee: Nippon Soken, Inc., Nishio, Japan

[21] Appl. No.: 580,754

[22] Filed: May 27, 1975

[30] Foreign Application Priority Data

June 3, 1974  Japan .............................. 49-62691

[51] Int. Cl.² ........................................ G08B 21/00
[52] U.S. Cl. ......................... 340/244 R; 73/290 V;
335/90; 335/153; 335/179; 340/59; 340/236;
335/229
[58] Field of Search ................. 340/244 R, 236, 59;
73/32 R, 290 R, 290 V, DIG. 5; 335/179, 177,
153, 229, 81, 90

[56] References Cited

U.S. PATENT DOCUMENTS

| 2,808,581 | 10/1957 | Findlay ........................... 340/244 R |
| 3,100,390 | 8/1963 | Banks ........................... 73/290 V X |
| 3,287,720 | 11/1966 | Chambers et al. .......... 340/244 R X |

*Primary Examiner*—Donald J. Yusko
*Assistant Examiner*—Daniel Myer
*Attorney, Agent, or Firm*—Cushman, Darby & Cushman

[57] ABSTRACT

A liquid level sensing system comprises a permanent magnet mounted in a cylindrical supporting case disposed in a housing and provided with a resistance plate at one end thereof, a reed switch arranged parallel to the permanent magnet and electromagnetic means including an iron core and a coil arranged above the supporting case and on the same axis as the permanent magnet. When the level of the engine oil goes down, the reed switch and the electromagnetic means cause the permanent magnet to vertically vibrate in the supporting case in the axial direction thereof thus causing for example a lamp to flash on and off and indicate the existence of an irregularity. With the construction described above, the system of this invention is capable of sensing an abnormal deterioration of the engine oil in addition to the sensing of the engine oil level.

5 Claims, 9 Drawing Figures

FIG. 4(A)
FIG. 4(B)
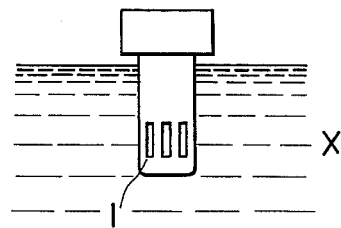
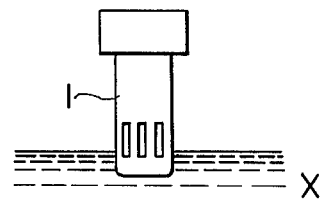
FIG. 5
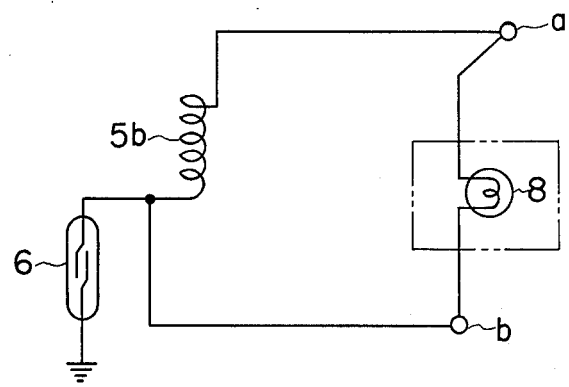
FIG. 6
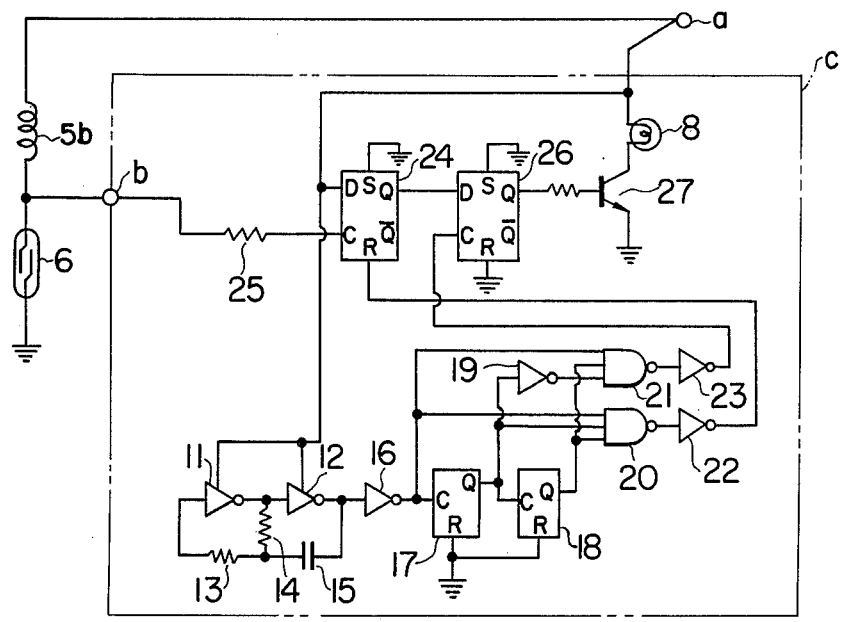

LIQUID LEVEL SENSING SYSTEM

BACKGROUND OF THE INVENTION

1. Field of the Invention

The present invention relates to a liquid level sensing system for detecting the level of the engine oil or the like in an automotive vehicle.

2. Description of the Prior Art

Engine oil level sensing systems for automotive vehicles which utilize a float are known in the art. A disadvantage of this type of liquid level sensing system is that since the viscosity of the engine oil is high at low engine temperatures such as before the engine has been started, the float and its guide shaft are held together by the high viscosity engine oil with the result that the float cannot move smoothly by virtue of its dead weight and thus the system cannot ensure accurate sensing of the engine oil level.

SUMMARY OF THE INVENTION

With a view to overcoming the foregoing difficulty, it is the object of the present invention to provide a liquid level sensing system wherein electromagnetic means causes a permanent magnet to self-vibrate, whereby the permanent magnet is caused to start or stop its vibrations in accordance with the degree of its immersion in the engine oil thus sensing the level of the engine oil.

In accordance with the present invention, the vibrations of a permanent magnet are changed positively in accordance with the level of any oil whose viscosity increases at low temperatures, thus ensuring accurate detection of the oil level. Further, while the conventional float type system must be mounted in such a direction that the float is positioned parallel to the oil level, in accordance with the present invention it is only necessary to mount the system at the desired sensing position with the result that there is no limitation to the mounting direction or position of the system relative to the oil level and the mounting of the system is simplified. Furthermore, in case of oils whose viscosity considerably decreases with deterioration of the oils, when the viscosity of the oil decreases considerably, even though the level of the oil is sufficiently high, the viscosity resistance of the oil is overcome by the force of vibration of the permanent magnet and therefore the permanent magnet starts to vibrate thus indicating the deterioration of the oil.

BRIEF DESCRIPTION OF THE DRAWING

FIGS. 4(A) and 4(B) are schematic views showing different oil levels which are useful in explaining the operation of the embodiment shown in FIG. 1.

FIG. 5 is a wiring diagram showing another embodiment of the system according to the present invention.

FIG. 6 is a wiring diagram showing still another embodiment of the system according to the present invention.

DESCRIPTION OF THE PREFERRED EMBODIMENTS

The present invention will now be described in greater detail with reference to the illustrated embodiments.

Figure 1:
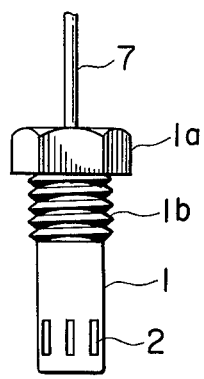
FIG. 1 is an exterior view of an embodiment of a liquid level sensing system according to the present invention.
Figure 2:
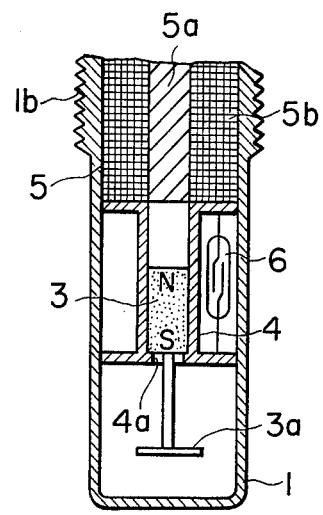
FIG. 2 is a partial sectional view of the embodiment shown in FIG. 1.

Referring to FIGS. 1 through 3, numeral 1 designates a housing made from an electrically conductive metal such as brass and provided with a hexagonal portion 1a and a threaded portion 1b at the upper part thereof. 2 slots for introducing oil or a liquid to be measured into the housing 1. Numeral 3 designates a cylindrical permanent magnet magnetized as shown and provided with a resistance plate 3a on its lower end, 4 a cylindrical supporting case for supporting the permanent magnet 3 which is made from a non-magnetic material such as synthetic resin and into which the permanent magnet 3 is axially movably fitted, 4a a stopper for preventing the permanent magnet 3 from slipping out of the position. Numeral 5 designates electromagnetic means for causing the permanent magnet 3 to self-vibrate which comprises an iron core 5a and a coil 5b wound in such a manner that magnetic poles opposite to those of the permanent magnet 3 are produced in the iron core 5a when the coil 5b is energized. Numeral 6 designates a reed switch constituting a magnetic flux variation sensor for detecting the magnetic flux variations caused by the vibrations of the permanent magnet 3 with one end thereof grounded through the housing 1 and the other end connected to the coil 5b. Numeral 7 designates a lead-out wire, 8 an indicator lamp, 9 a vehicle ignition switch, 10 a battery constituting a power supply. Letter a designates a power supply terminal, b a signal terminal.

Figure 3A:
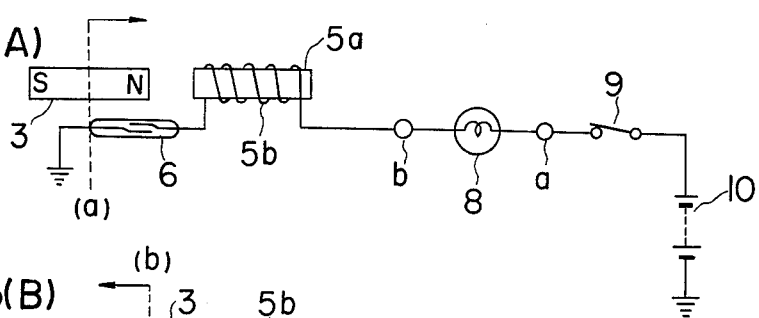
FIGS. 3(A) and 3(B) are fundamental schematic views which are useful in explaining the operation of the embodiment shown in FIG. 1.
Figure 3B:
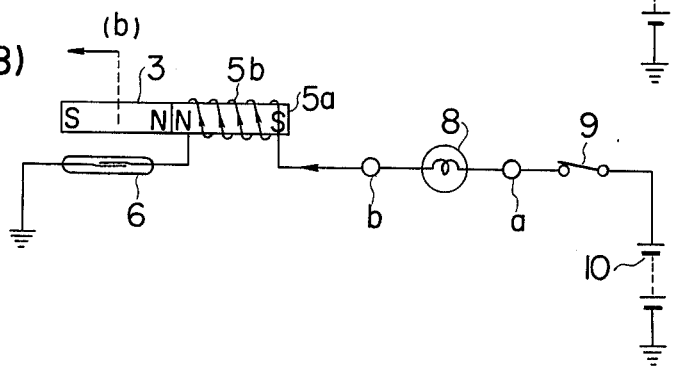

With the construction described above, the embodiment shown in FIGS. 1 through 3 operates as follows. When the level of oil X is sufficiently high as shown in FIG. 4(A), the oil is introduced into the housing 1 through the slots 2 and the resistance plate 3a is dipped in the oil. Consequently, the movement of the permanent magnet 3 is restrained by the viscosity resistance of the oil acting on the resistance plate 3a thus holding the permanent magnet 3 stationary in the corresponding position (i.e., the position shown in FIG. 3(A) or 3(B), so that the reed switch 6 is maintained in its on-position or off- position and the indicator lamp 8 does not flash. On the contrary, when the level of the oil X drops below normal as shown in FIG. 4(B), the resistance plate 3a comes out of the oil X and thus the viscosity resistance of the oil X no longer acts on the resistance plate 3a thus permitting the permanent magnet 3 to move in accordance with the attraction or repulsion of the magnetic poles. In this condition, if the permanent magnet 3 is spaced apart from the iron core 5a as shown in FIG. 3(A), the reed switch 6 is turned off so that the coil 5b is not energized and the iron core 5a is magnetized by the permanent magnet 3. Consequently, an attractive force acts between the permanent magnet 3 and the iron core 5a Σso that the permanent magnet 3 is attracted in a direction of an arrow and it is placed in the position shown in FIG. 3(B). When this occurs, the reed switch 6 is turned on by the magnetic force of the permanent magnet 3 and current flows through the coil 5b. Consequently, the iron core 5a is magnetized in opposite polarity from the permanent magnet 3 as shown in FIG. 3(B) and a repelling force is produced between the permanent magnet 3 and the iron core 5a thus moving the permanent magnet 3 in the direction of an arrow and placing it in the position shown in FIG. 3(A). At this time, the reed switch 6 is turned off as the permanent magnet 3 moves away therefrom. Repetitions of the process cause the permanent magnet 3 to self-vibrate and thus the reed switch 6 is turned on and off, causing the indicator lamp 8 to flash on and off to indicate that the level of the oil X is below normal.

On the other hand, when the level of the oil X is well above normal but the viscosity of the oil X decreases considerably due to its deterioration, the viscosity resistance acting on the resistance plate 3a decreases and becomes smaller than the attraction and repulsion which act on the permanent magnet 3, so that as was the case when the oil level was below normal, the permanent magnet 3 sets up a self-vibration and the lamp 8 flashes on and off, thus indicating that there is an irregularity.

FIG. 5 shows another embodiment of the system of this invention in which the indicator lamps 8 is connected in parallel with the coil 5b so that when there is any irregularity the lamp 8 flashes on and off thus indicating the irregularity in the like manner as the first embodiment.

Figure 7:
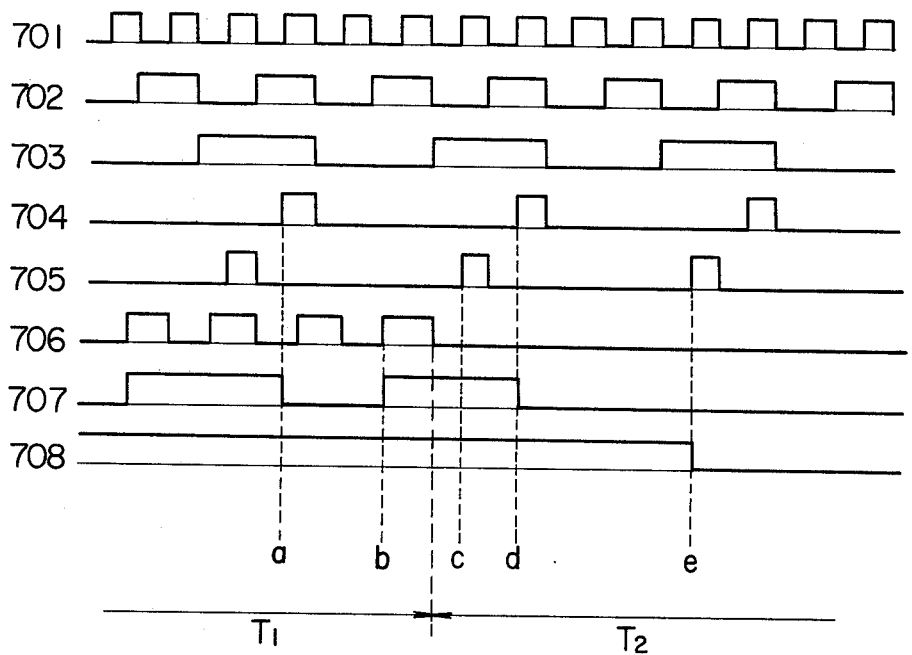
FIG. 7 is a diagram showing voltage waveforms generated at various points in the circuitry of FIG. 6.

FIG. 6 shows still another embodiment of the system of this invention, in which the output pulse signals from the reed switch 6 are converted into a DC signal so that the lamp 8 goes on when the oil level drops below normal, while the lamp 8 goes off when the oil level is normal, thus giving the required indication. In FIG. 6, letter $a$ designates a supply terminal, $b$ a signal terminal, 5b a coil, 6 a reed switch. A block $c$ designates an indicating electric circuit. The operation of this circuit is as follows. A known type of a CR oscillator circuit is constituted by inverter gates 11 and 12, resistors 13 and 14 and a capacitor 15, and the output pulse signal of this oscillator circuit is reshaped by an inverter gate 16 whose output signal has the waveform shown in FIG. 7-701. The frequency of the signal shown in FIG. 7-701 is divided in two stages by flip-flops 17 and 18 so that the output of the flip-flop 17 has the waveform shown in FIG. 7-702 and the output of the flip-flop 18 has the waveform shown in FIG. 7-703. The logical operations are performed by NAND gates 20 and 21 and inverter gates 19, 22 and 23 on the signals 701, 702 and 703, thus generating the reset signal shown in FIG. 7-704 at the output of the inverter gate 22 and the storage signal shown in FIG. 7-705 at the output of the inverter gate 23. Assuming now that a D-type flip-flop 24 is placed in the initial state by the reset signal 704 at a point $a$ in FIG. 7, then a 0 signal appearing at the output of the D-type flip-flop 24 is generated. When the oil level is below normal, the pulse signals shown in FIG. 7-706 ($T_1$ interval) are generated at the signal terminal $b$ and the signals are applied to the clock input of the D-type flip-flop 24 through a resistor 25. As a result, the output signal of the D-type flip-flop 24 goes from 0 to 1 (FIG. 7-707) in response to the rising of the clock input signal following the releasing of the reset state of the D-type flip-flop 24, that is, at a point $b$ in FIG. 7. This 1 signal is applied to the data input of the following D-type flip-flop 26. Consequently, the level of the data input existing at the time that the clock input signal rises or a point $c$ in FIG. 7 appears at the output of the D-type flip-flop 26 thus causing its output signal to go from 0 to 1. Thus, even after the D-type flip-flop 24 has been reset to the initial state by the reset signal 704, as shown in FIG. 7-708, the 1 signal is maintained at the output of the D-type flip-flop 26 so far as the oil level remains below normal and the pulse signals are generated at the terminal $b$. This 1 signal renders a transistor 27 conductive and the indicator lamp 8 is lighted thus indicating the abnormal level of the oil. On the other hand, when the oil level returns to the normal condition and no pulse signals are generated at the terminal $b$ as shown in an interval $T_2$ of FIG. 7, the output signal of the D-type flip-flop 24 goes to 0 since no rising signal is applied to the clock input after the D-type flip-flop 24 has been reset to the initial state at a point $d$ in FIG. 7. Consequently, when the storage signal 705 rises at a point $e$ in FIG. 7, the output signal of the D-type flip-flop 26 changes from 1 to 0 as shown in FIG. 7-708. As long as the oil level remains above normal, that is, as long as no rising signal is applied to the clock input of the D-type flip-flop 24, the 0 signal remains on at the output of the D-type flip-flop 26 and the transistor 27 is rendered non-conductive, thus causing the indicating lamp 8 to go off and indicating that the oil level is normal.

While, in the embodiments of the invention described hereinabove, the required indications are provided by the lamp 8, any device that makes a sound such as a buzzer may equally be used. Further, while the system according to the present invention has been described as applied to a sensor for an indicating system, it may equally be used as a sensor for various control systems. Still further, while, in the embodiments described above, the variation of magnetic flux caused by the vibration of the permanent magnet 3 is detected by the reed switch 6, other elements such as a magnetic reluctance element whose resistance value is varied by magnetism, may be used, in which case it is of course necessary to provide a switching circuit for switching on and off the flow of current through the coil 5b in accordance with the output signals of the magnetic reluctance element. Furthermore, while, in the embodiments described above, the resistance plate 3a is attached to the permanent magnet 3 to cause the viscosity resistance of the oil to act on the permanent magnet 3, it is needless to say that the resistance plate 3a may be eliminated by arranging in such a manner that the permanent magnet 3 is directly immersed in the oil.

What is claimed is:
1. A liquid level sensing system comprising:
a permanent magnet on which the viscosity resistance of a liquid to be measured acts;
electromagnetic means for causing said permanent magnet to set up a self-vibration; and
a magnetic flux change detector for detecting the variations of magnetic flux caused by the vibrations of said permanent magnet, whereby in accordance with the variations of said viscosity resistance acting on said permanent magnet caused by the variations of the level of said liquid, said permanent magnet is caused to set up or stop a self-vibration and thereby to detect the level of said liquid,
wherein said electromagnetic means is fixedly mounted in a housing, said permanent magnet is displaceably mounted in said housing relative to said electromagnetic means, and said magnetic flux change detector is fixedly mounted in said housing to detect the positions of said permanent magnet,
wherein said electromagnetic means include a coil wound into a cylindrical form and an iron core inserted into said coil in the axial direction thereof, and said iron core is magnetized by the energization of said coil to repel said permanent magnet, and wherein said magnetic flux change detector is connected in series with said coil, whereby the supply of current to said coil is switched on and off in response to the positions of said permanent magnet.

2. A liquid level sensing system comprising:
a hollow cylindrical housing;
a coil wound on an iron core fixedly mounted in said housing and adapted to be energized to magnetize said iron core;
a permanent magnet axially displaceably supported in said housing and responsive to the magnetization of said iron core to set up a self-vibration in said axial direction;
a resistance plate secured to said permanent magnet to offer resistance to the self-vibration of said permanent magnet in accordance with the viscosity resistance of a liquid to be measured; and
a reed switch connected in series with said coil and fixedly mounted in said housing, said reed switch opening and closing in response to the self-vibration of said permanent magnet to energize and de-energize said coil.

3. A system for sensing a reduction in the level and viscosity resistance of a liquid comprising:
a vibratable permanent magnet normally restrained from moving by the viscosity resistance of said liquid but relatively unrestrained and hence movable between first and second positions upon reduction of the level and viscosity resistance,
a permanent magnet position detector for detecting said first and second positions, and
electromagnetic vibrating means having a core and being connected to said detector and having an electromagnetically inoperative condition caused by said detector detecting said first position to cause said unrestrained permanent magnet to be attracted to said core and an electromagnetically operative condition caused by said detector detecting said second position to cause said core to repel said magnet back to said first position to cause said magnet to vibrate substantially between said positions only as long as it is relatively unrestrained as aforesaid.

4. A system as in claim 3 wherein said electromagnetic means is fixedly mounted in a housing, said permanent magnet is displaceably mounted in said housing relative to said electromagnetic means, and said magnetic flux change detector is fixedly mounted in said housing to detect the positions of said permanent magnet, wherein said electromagnetic means include a coil wound into a cylindrical form and an iron core inserted into said coil in the axial direction thereof, and said iron core is magnetized by the energization of said coil to repel said permanent magnet, and wherein said magnetic flux change detector is connected in series with said coil, whereby the supply of current to said coil is switched on and off in response to the positions of said permanent magnet, and further including warning means for providing a repeated on-off indication only during vibration of said magnet.

5. A system according to claim 3 further comprising warning means connected to said detector through said electromagnetic means.

* * * * *